(12) United States Patent
Gazaix et al.

(10) Patent No.: US 11,701,857 B2
(45) Date of Patent: Jul. 18, 2023

(54) FLEXIBLE TRANSPARENT MATERIAL WITH REINFORCEMENT THREADS

(71) Applicant: SERGE FERRARI SAS, Saint Jean de Soudain (FR)

(72) Inventors: Guillaume Gazaix, Saint Andre le Gaz (FR); Jonathan Rojon, Glattfelden (CH)

(73) Assignee: SERGE FERRARI SAS, Saint Jean de Soudain (FR)

( * ) Notice: Subject to any disclaimer, the term of this patent is extended or adjusted under 35 U.S.C. 154(b) by 0 days.

(21) Appl. No.: 17/413,812

(22) PCT Filed: Dec. 12, 2019

(86) PCT No.: PCT/FR2019/053041
§ 371 (c)(1),
(2) Date: Jun. 14, 2021

(87) PCT Pub. No.: WO2020/128247
PCT Pub. Date: Jun. 25, 2020

(65) Prior Publication Data
US 2022/0024175 A1 Jan. 27, 2022

(30) Foreign Application Priority Data
Dec. 19, 2018 (FR) ...................... 1873394

(51) Int. Cl.
*B32B 5/02* (2006.01)
*B32B 5/08* (2006.01)
(Continued)

(52) U.S. Cl.
CPC .............. *B32B 5/024* (2013.01); *B32B 5/028* (2013.01); *B32B 5/08* (2013.01); *B32B 27/12* (2013.01);
(Continued)

(58) Field of Classification Search
CPC ........... B32B 5/024; B32B 5/028; B32B 5/08; B32B 27/12
(Continued)

(56) References Cited

U.S. PATENT DOCUMENTS 3,623,937 A 11/1971 Gasaway
4,013,812 A 3/1977 Geiger
(Continued)

FOREIGN PATENT DOCUMENTS

GN 108778728 A 11/2018

OTHER PUBLICATIONS

Development of UV Protective Sheath for High Performance Fibers for High Altitude Applications, Won et al., Fibers and Polymers 2013, vol. 14, No. 4, 647-652 (Year: 2013).*

*Primary Examiner* — Vincent Tatesure
(74) *Attorney, Agent, or Firm* — Forge IP, PLLC

(57) ABSTRACT

A translucent or transparent composite flexible sheet includes at least one reinforcing layer comprising high tenacity yarns; and a fluorinated polymeric film which is translucent or transparent to visible light, which is integral with the reinforcing layer. The reinforcing layer is a textile with a light transmittance of more than 40%, and includes high tenacity yarns based on an aromatic block polyester with a Young's modulus of more than 50 GPa. The yarns have a sheath of material which blocks ultraviolet radiation.

8 Claims, 2 Drawing Sheets

(51) Int. Cl.
  *B32B 27/12*   (2006.01)
  *B32B 27/30*   (2006.01)
  *B32B 27/32*   (2006.01)

(52) U.S. Cl.
  CPC ........... *B32B 27/304* (2013.01); *B32B 27/322* (2013.01); *B32B 2262/0276* (2013.01); *B32B 2262/16* (2021.05); *B32B 2305/38* (2013.01); *B32B 2307/412* (2013.01); *B32B 2307/414* (2013.01); *B32B 2307/54* (2013.01); *B32B 2307/73* (2013.01); *Y10T 428/249948* (2015.04)

(58) Field of Classification Search
  USPC ...................................................... 428/300.1
  See application file for complete search history.

(56) References Cited

U.S. PATENT DOCUMENTS

| | | | |
|---|---|---|---|
| 4,452,848 A | 6/1984 | Geiger | |
| 8,883,302 B2* | 11/2014 | Zachariades | D07B 5/005 428/68 |
| 10,751,973 B2 | 8/2020 | Sargent | |
| 2006/0213173 A1* | 9/2006 | Kolmes | D02G 3/442 57/210 |
| 2014/0127451 A1* | 5/2014 | Pilpel | B32B 5/12 428/113 |
| 2014/0130657 A1* | 5/2014 | Pilpel | B32B 27/286 156/308.2 |

* cited by examiner

FLEXIBLE TRANSPARENT MATERIAL WITH REINFORCEMENT THREADS

TECHNICAL FIELD OF THE INVENTION

The present invention relates to a composite material that allows light to pass through. In particular, the present invention relates to the field of flexible construction materials insofar as they can, for example, be used to form a roofing or facade element, or to form a temporary shelter.

For mechanical and aesthetic reasons, flexible materials of this type are preferably stretched. More precisely, the present invention is of particular application in the production of roofing or facade elements which allow natural light to pass through.

PRIOR ART

In the context of the invention, the term "roofing" designates the material of which the roof of a building such as, for example, a house, a shed, or a stadium is composed, or in fact any surface of an object which is intended to isolate an interior space from precipitation such as, for example, a tent material, a glasshouse covering, or indeed a soft top of an automotive vehicle.

When forming roofing, the use of flexible materials is well known in the prior art, in fact, compared with roofing composed of rigid tiles, these flexible materials can be used to obtain aesthetically refined roofing while at the same time producing impermeability as regards precipitation such as rain.

In general, a flexible material of this type is known which has the characteristic of transparency which allows natural light to pass through into the space protected by the roofing.

As an example, U.S. Pat. No. 4,013,812 describes a membrane for the production of roofing, composed of a grid of glass fibres coated with a plastic material and a film of transparent plastic material.

Similarly, U.S. Pat. No. 3,623,937 describes a composite material composed of a film of transparent plastic material associated with a woven network of glass fibres, coated with polyvinyl chloride.

Although these materials are transparent, they comprise glass fibres in their structure, which therefore imposes specific restrictions on handling, fitting and use.

In fact, glass fibres have a low strength after crease fold because of the mechanical characteristics of glass. In order to preserve its integrity and its mechanical performance, therefore, uses for such a material are limited to definitively flat structures or those with a very slight curvature. Thus, this naturally excludes applications in which the material is necessarily subjected to repeated or even cyclic mechanical loads, for example when passing from a folded position to a deployed position, or indeed from a rolled position to an unrolled position. This also imposes restrictions on loading linked to the transport of these materials between the production location and the installation site, which restrictions increase with increasing dimensions of the structures.

DISCLOSURE OF THE INVENTION

The technical problem which the invention is intended to solve is therefore to propose a transparent flexible material provided with mechanically reinforcing yarns, having mechanical features which render it capable of being used in applications in which it will be subjected to mechanical folding loads which may be ad hoc or multiple, or even cyclic.

Thus, the present invention proposes solving this technical problem by means of a composite flexible sheet which is translucent or transparent, comprising at least one reinforcing layer comprising high tenacity yarns and a polymeric film which is translucent or transparent to visible light, which is integral with said reinforcing layer.

More precisely, this flexible sheet is characterized in that the reinforcing layer is a textile having a light transmittance of more than 10%, preferably more than 30%, or even 40% and highly preferably 45%, and comprising high tenacity yarns based on aromatic polyester having a Young's modulus of more than 50 GPa, said yarns having a sheath of material which blocks ultraviolet radiation.

The term "blocking ultraviolet radiation" means that the degree of transmission of the sheath as regards ultraviolet radiation is less than 50%.

Advantageously, said textile may be a grid or a woven material.

Advantageously, the membrane is impermeable to liquid water because a continuous film is used. Thus, the flexible material of the invention may be used in the production of roofing or, in general, for the production of watertight structures.

The sheath protecting the reinforcing yarns from ultraviolet radiation may be produced in a variety of manners. Thus, in accordance with a first embodiment of the invention, the sheath coats the high tenacity yarn in a continuous manner. This sheath is formed by a material which is coated onto the reinforcing yarn. In other words, the coated material forms a continuous sheath which covers the whole of the reinforcing yarn. This sheath may be produced by extrusion onto the reinforcing yarn, optionally after impregnation intended to increase the grip of the material of the sheath on the yarn. It is also possible to deposit the material of the sheath on the yarn by impregnation, in particular by using multiple passes.

In a particular embodiment, the sheath may comprise a plurality of superimposed layers obtained, for example, by successive extrusions, or indeed by co-extrusion. The inner layer, in contact with the reinforcing yarn, provides protection for the latter and, for example, includes fillers for blocking ultraviolet radiation. The outer layer may incorporate pigments which can be used to mask the inner layer of the sheath, in particular when the latter is black or dark in colour. This outer layer of the sheath is compatible with the translucent or transparent film with which the web of reinforcing yarns is integrated. In particular, the outer layer may have a softening point which is lower than that of the inner layer so that the latter can retain cohesion during the operations of assembling the web and the film which necessitate softening the outer layer of the sheath. Clearly, the invention also encompasses solutions in which the sheath is constituted by more than two distinct layers.

In a further embodiment, it is possible for the transparent or translucent film to comprise a plurality of superimposed layers, and in particular a layer which comes into contact with the web of yarns which has a softening temperature which is lower than that of the other layer or layers. In this manner, when the film is heated during assembly thereof with the web of yarns, only a portion of the thickness of the film is softened, and the remainder of the film deforms little or not at all during assembly.

In a particular case, the use of a yarn with a multi-layered sheath may be combined with a film which is also multi-layered, wherein the respective facing layers are materials which soften during assembly of the web of yarns and the film, while the other layers do not soften and retain their initial dimensional properties.

Other techniques may be envisaged in order to cover the reinforcing yarn with a sheath which protects it from external light. Thus, in accordance with a second embodiment of the invention, said sheath is composed of an elongated element (yarn or tape) covering the reinforcing yarn, forming thereon a helix deposited by wrapping. In a more sophisticated embodiment, the sheath may be composed of two wraps, each having a direction of winding which differs from the other. It is also possible to cover the yarn by means of a braiding operation.

Advantageously, the wrapping or braiding may be carried out with a tape of material which blocks all or a portion of the ultraviolet radiation.

Advantageously, the reinforcing layer and the polymeric film are co-laminated together.

Advantageously, said polymeric film is selected from the following materials: polyvinylidene fluoride, also known by the acronym PVDF, or a polymer based on tetrafluoroethylene, hexafluoropropylene and vinylidene fluoride, also known by the acronym THV, fluorinated ethylene propylene (FEP), perfluoroalkoxy (PFA) and in general, many fluorinated polymers as well as fluorinated acrylics and methacrylics, used alone or as a mixture.

BRIEF DESCRIPTION OF THE FIGURES

The way of carrying out the invention as well as the advantages thereof will become apparent from the following description of various embodiments, made by way of non-limiting indication and with the aid of the accompanying drawings, in which.

DETAILED DESCRIPTION OF THE INVENTION

Figure 1:
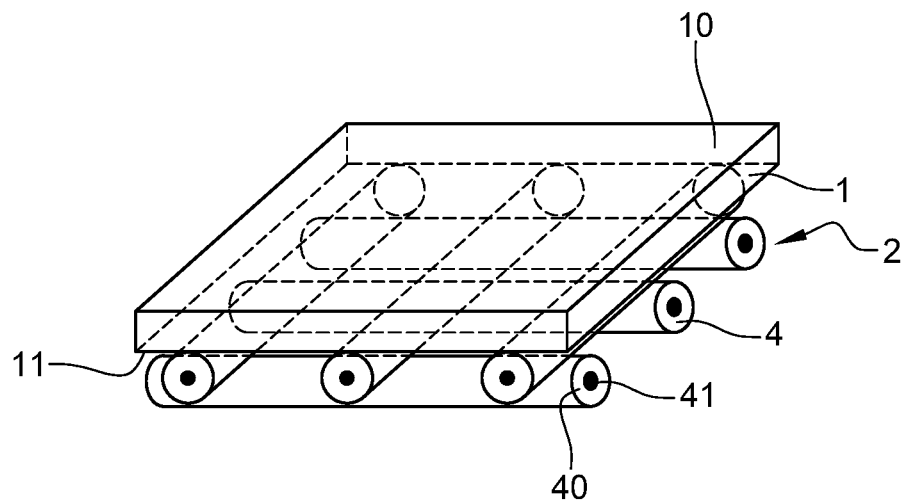
FIG. 1: is a perspective view of a flexible sheet constituting a first embodiment of the invention.

The invention concerns the field of composite flexible materials. More specifically, the invention concerns a composite flexible sheet. This composite flexible sheet is composed on the one hand by a polymeric film 1, and on the other hand by a textile reinforcing layer 2 which is integral with the polymeric film 1.

The polymeric film 1, which is generally flat, is advantageously translucent or transparent. In fact, its light transmittance is advantageously more than 80%, and more advantageously more than 90%. It is composed of a polymeric material, advantageously fluorinated, such as PVDF or THV.

The polymeric film 1 has a thickness in the range 50 to 500 µm, more advantageously close to 200 µm. It has an upper face 10 which is configured in order to resist bad weather, in particular by being impermeable to liquid water, and a lower face 11.

In accordance with a first embodiment of the invention illustrated in FIG. 1, said composite sheet is composed of a polymeric film 1 which is integral, via its lower face 11, with a textile grid 2.

This textile grid 2 is constituted by two identical webs which are superimposed perpendicularly with respect to each other, and constituted by mutually parallel reinforcing yarns 4. The reinforcing yarns 4 are disposed in a manner such as to have several yarns per centimetre in the plane transverse to each web. In this manner, the natural light transmittance through said flexible sheet is more than 45%.

Each reinforcing yarn 4 is substantially cylindrical, and comprises a core 41 which is advantageously composed of a Vectran® yarn marketed by KURARAY and having a linear density of between 400 and 3000 dtex, advantageously with a linear density of between 1600 and 1700 dtex, and yet more advantageously with a linear density of 1670 dtex. In a variation, the core may be produced with a Siveras® yarn marketed by TORAY.

In one embodiment, the reinforcing web 2 is produced with reinforcing yarns 4 in an amount of 2.5 yarns/cm. Preferably, the Young's modulus of the Vectran® yarn composing the core 41 is more than 50 GPa.

A sheath 40 surrounds each reinforcing yarn 4. In one embodiment, it is constituted by a polyvinylidene fluoride (PVDF) copolymer which is coloured black using carbon black pigments. Advantageously, the sheath 40 completely envelops each reinforcing yarn 4, in a manner such as to block or at least substantially limit the penetration of any light radiation, and in particular ultraviolet radiation. Other anti-UV agents or various coloured pigments may be used to provide the UV radiation blocking effect and to protect the yarn 4. Examples of other materials which are satisfactory for this function that may be cited are zinc oxide, titanium dioxide, benzotriazole or hydroxyphenyl triazine.

In fact, Vectran® is a material with mechanical and resistance performances which deteriorate over time when it is exposed to ultraviolet radiation, for example from the sun.

Advantageously, this sheath 40 is obtained directly by means of a process for extrusion around the core 41. It is thus mechanically integral with the core 41, and covers it in a uniform manner over its entire circumference. Prior impregnation of the core of the yarn, for example based on polyurethane or in fact on an emulsion of PVDF, may be useful in order to ensure a good grip of the material of the sheath on the core of the yarn.

The sheath 40 may also be formed by at least one wrap of a tape composed of PVDF or the like, preferably coloured black with the aid of carbon black pigments, helically wound around the sheath 40. This wrap covers the entire surface of the core 41. Finally, the total diameter of each reinforcing yarn 4 is in the range 0.8 to 1 mm, and is advantageously close to 0.9 mm. Each reinforcing yarn 4 has a linear density in the range 9500 to 10000 dtex, advantageously close to 9900 dtex. When placed under tension, the reinforcing yarns 4 allow said composite sheet to be stretched, and thus roofing which is impermeable to liquid water or to any other form of precipitation can be produced.

The textile grid 2 is integral with said polymeric film 1 via the sheath 40. In fact, this is locally fused with the lower face 11 of the polymeric film 10. Thus, the textile grid 2 is mechanically bonded to the polymeric film 1, which advantageously means that the mechanical strength of the composite sheet can be reinforced.

Figure 2:
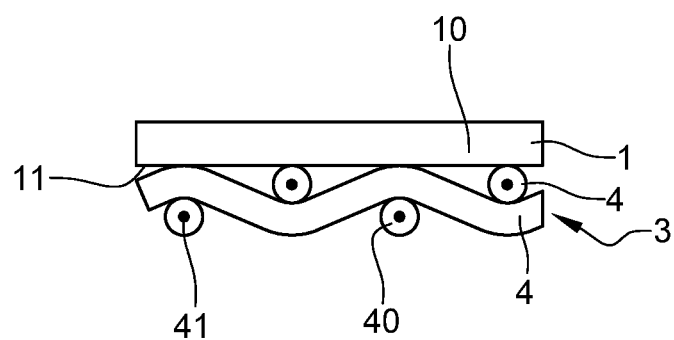
FIG. 2: is a cross section of a flexible sheet in accordance with the invention, constituting a second embodiment.

In accordance with a second embodiment of the invention, illustrated in FIG. 2, the textile reinforcing layer advantageously takes the form of a woven textile 3 composed of high tenacity yarns 4 identical to those present in the first embodiment of the invention.

Figure 3:
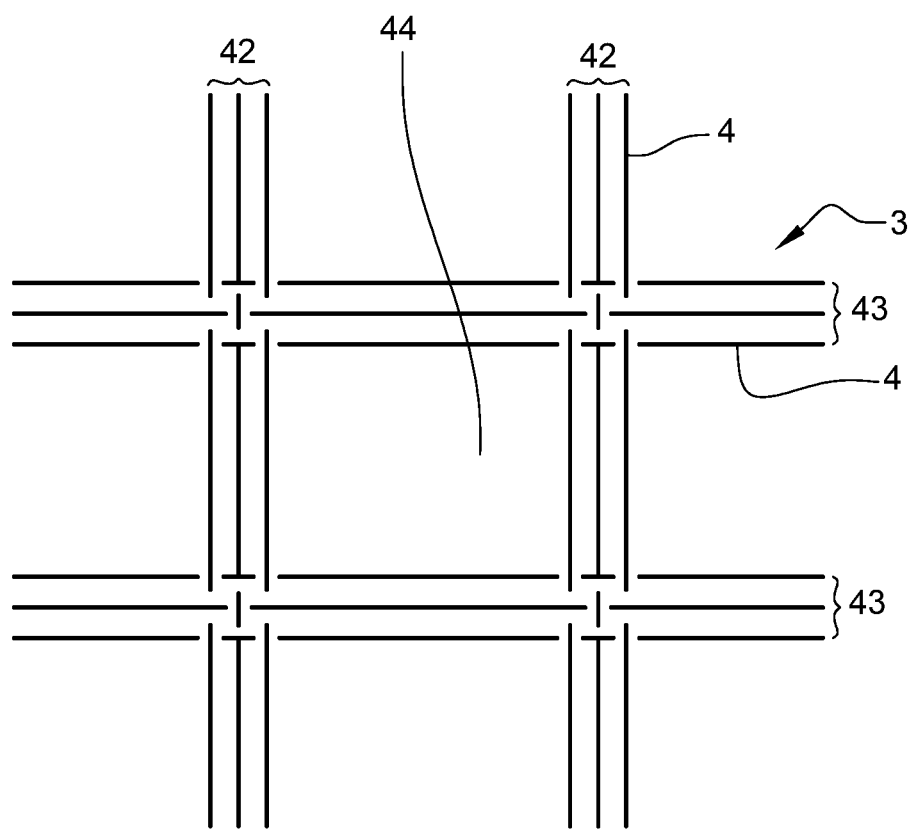
FIG. 3: is a top view of a woven textile which can constitute the second embodiment of the invention.

The nature of this woven textile 3 may vary. As an example, as can be seen in FIG. 3, the high tenacity yarns 4 form an apertured weave in which the warp and weft yarns are grouped into sub-assemblies which therefore form bundles of warp yarns 42 and bundles of weft yarns 43. Each of the bundles 42, 43 is composed of three high tenacity yarns 4 distributed in the plane of said flexible sheet in an amount of 2.5 yarns/cm.

In this manner, the woven textile 3 has aperture zones 44 formed by the intersections between the bundles of warp yarns 42 and the bundles of warp yarns 43, advantageously enabling natural light to pass through said woven textile 3, and thus limiting the impact of the textile structure on the light transmittance through said flexible sheet.

In the form illustrated in FIG. 3, the high tenacity yarns 4 forming the bundles of warp yarns 42 and the bundles of weft yarns 43 are interlaced in order to form a linen type weave.

In a variation which is not shown, it may be advantageous for the high tenacity yarns contained in the bundles of warp yarns and the bundles of weft yarns to compose a leno weave. This type of weave limits or even blocks the displacement of the high tenacity yarns within the bundles of yarns, which provides the woven textile with stability and provides it with increased resistance to other manipulations, in particular before assembly with the film.

The use of Vectran® yarns or, more generally, aromatic block polyesters, means that the membrane is provided with long-lasting mechanical strength when it is stressed by service loads such as cycles of rolling up/unrolling, or even of folding/unfolding.

In fact, these service loads cause a reduction in the mechanical properties of the fibres. The Applicant has observed that the mechanical properties of Vectran® yarns deteriorate much less than yarns of glass during a test for measuring the number of fibres which break after application of a load after folding, as defined in the standard ASTM D4851, and so it is advantageously utilised in order to produce the core 41. In summary, this test consists of making a loop of a 5 cm wide strip of the material to be tested. This strip is pressed by a roller which is 90 mm in diameter and 100 mm wide so that the loop is flattened repeatedly at a rate of 10 passes in 10 seconds. The strip is then flattened out again and its tensile strength is measured in a conventional manner. The tests which were carried out in this manner exhibited a near zero reduction in strength, in all cases less than 5% or even 10% compared, for example, with a reduction of the order of 20% for an analogous material with glass reinforcing yarns.

Clearly, the invention also encompasses variations in which the reinforcing yarns are produced from a material with a high resistance to folding cycles and a high tensile strength. Furthermore, other fluorinated polymers may be employed both for the film and for the sheath of reinforcing yarns, by selecting those with a softening temperature of less than 300° C., or even 320° C., corresponding to the degradation temperature of the reinforcing yarns, which should not be exceeded during the operation for integrating the web of yarns with the film.

Thus, the invention has the advantage of providing a, membrane which has a very high light transmittance because very strong reinforcing yarns are used which can therefore be spaced apart relative to each other. This good transmittance is combined with an excellent resistance to folding, which means that parts with large dimensions can be formed which are, however, easy to transport by folding them, without substantially modifying the mechanical and visual properties following deployment. The use of a low density of yarns (of the order of 1.4) means that large spans of these mem branes can be deployed in the vertical position as well as in the horizontal position. Thus, this membrane is entirely suitable for the production of architectural structural roofing or facade elements, or even for a self-supporting inflatable type of structure.

The invention claimed is:

1. A composite flexible sheet which is translucent or transparent, having a light transmittance of more than 45%, comprising:
   at least one reinforcing layer comprising high tenacity yarns; and
   a polyvinylidene fluoride film which is translucent or transparent to visible light, which is integral with said reinforcing layer;
said flexible sheet being characterized in that the reinforcing layer is a textile comprising high tenacity yarns based on an aromatic block polyester having a Young's modulus of more than 50 GPa, each of said yarns being completely covered by a sheath of material which blocks ultraviolet radiation, said flexible sheet having a reduction in its tensile strength of less than 10% after having undergone a fold test in accordance with the standard ASTM D4851; and
   wherein said at least one reinforcing layer and said polyvinylidene fluoride film are co-laminated together.

2. The flexible sheet as claimed in claim 1 characterized in that said textile is a grid.

3. The flexible sheet as claimed in claim 1, characterized in that the flexible sheet is impermeable to liquid water.

4. The flexible sheet as claimed in claim 1, characterized in that said sheath covers the high tenacity yarn in a continuous manner.

5. The flexible sheet as claimed in claim 4, characterized in that said sheath is formed from at least two superimposed layers.

6. The flexible sheet as claimed in claim 1, characterized in that said sheath is composed of a wrap.

7. The flexible sheet as claimed in claim 5, characterized in that said sheath is composed of two wraps each having a winding direction which is different from the other.

8. The flexible sheet as claimed in claim 5, characterized in that said wrap is a tape of material which blocks ultraviolet radiation.

\* \* \* \* \*